United States Patent [19]

Colamussi

[11] Patent Number: 4,890,718

[45] Date of Patent: Jan. 2, 1990

[54] HIGH-CAPACITY PHYSICAL AND/OR CHEMICAL TREATMENT APPARATUS IN AN AUTOMATIC PRODUCT PRODUCTION PLANT

[75] Inventor: Arturo Colamussi, Ferrara, Italy

[73] Assignee: Vortex Systems S.r.l., Fossalta Di Copparo, Italy

[21] Appl. No.: 214,414

[22] Filed: Jul. 1, 1988

[30] Foreign Application Priority Data

Jul. 21, 1987 [IT] Italy ................. 21367 A/87

[51] Int. Cl.$^4$ ............................................ B65G 49/00
[52] U.S. Cl. ......................... 198/465.3; 198/435; 198/483.1; 414/331; 414/787
[58] Field of Search ............. 198/465.3, 435, 803.2, 198/483.1, 463.2, 463.3; 414/331, 787, 417; 62/378, 380, 382; 99/517

[56] References Cited

U.S. PATENT DOCUMENTS 3,068,987  12/1962  Franklin ................. 198/465.3 X
3,324,786   6/1967  Geiser et al. ............... 99/517
3,584,750   6/1971  Temple .................... 414/331
3,831,293   8/1974  Ingram et al. ............ 62/378 X

FOREIGN PATENT DOCUMENTS 2817732  10/1979  Fed. Rep. of Germany ...... 198/435
3442161   5/1986  Fed. Rep. of Germany ...... 414/331
6404364   4/1964  Netherlands ................. 62/378

Primary Examiner—Robert J. Spar
Assistant Examiner—Lyle Kimms
Attorney, Agent, or Firm—Charles E. Brown; Charles A. Brown

[57] ABSTRACT

In an automatic plant for the production of products, such as food products, in which modular supports carrying a determined number of products are used. A high-capacity physical and/or chemical treatment apparatus provides a temporary storage facility sufficient to ensure continuity of operation and production of the plants positioned downstream and upstream thereof, even if one or the other is momentarily at rest.

10 Claims, 3 Drawing Sheets

HIGH-CAPACITY PHYSICAL AND/OR CHEMICAL TREATMENT APPARATUS IN AN AUTOMATIC PRODUCT PRODUCTION PLANT

This invention relates to a high-capacity physical and/or chemical treatment apparatus in an automatic product production plant. Production plants or lines are known which have in succession a plurality of apparatuses or sections which provide for the complete treatment of a product. For example starting from the mixing of the various components and proceeding through a series of predetermined steps to the packaging or boxing of the product. An example of such a plant is illustrated in Italian patent application No. 20706 A/85 in the name of the present applicant. Such a plant maintains properly ordered product arrangement during the entire production process by using modular supports so as to make the use of any rearranging machine unnecessary. Yet it has certain limits in spite of a certain degree of flexibility attainable using modular supports. In this respect, the device used for conveying the products through such an apparatus, for example a conditioning tunnel, is generally of the so-called "endless" type, in which the products are moved in succession one behind the other by entrainment elements such as chains, conveyors and/or pushers.

As current production lines are composed of a plurality of apparatuses disposed in series and thus linked together, it is apparent that the use of such a conveying device leads to total rigidity of the entire system. Any hold-up or stoppage downstream of the conditioning tunnel causes all the plant elements to stop, with consequent loss of yield and/or production. An object of the present invention is to provide a physical and/or chemical treatment apparatus which by utilizing the advantages of modular supports for the product is able to obviate plant hold-ups by absorbing any stoppages of the various devices downstream of the treatment apparatus. This ensures continuity of operation of the machines upstream of the packaging zone.

This and further objects are attained according to the present invention by a high-capacity physical and/or chemical treatment apparatus in an automatic product production plant in which modular supports are used to accompany the products along the plant. The treatment apparatus is characterised in that the modular supports are loaded within the apparatus into at least one cylindrical rotary storage container divided into radial loading sectors. Each sector has a plurality of parallel guides positioned in superposed planes. There is provided a vertical support arrangement referred to as a stacking device for forming groups of modular supports to be loaded into the at least one cylindrical container and, in correspondence with the outlet end of the apparatus. A device able to receive one of the groups of loaded modular supports and to dismantle the one group and feed the modular supports in succession onto a conveyor means. Pusher associated with the stacker device and with the at least one cylindrical container to transfer the groups of modular supports into the next device in the apparatus.

Advantageously, in order to be able to continue to feed the treatment apparatus or tunnel when the packaging plant is at rest, a buffer or storage zone is created within the apparatus to hold a number of modular supports excessive to those normally present within the tunnel and undergoing the conditioning process. This object is attained by increasing the number of radial sectors of the rotary cylinder beyond those required on average for production. These sectors, which are of such a number as to provide a sufficient buffer area calculated on the basis of the typical hold-ups of the plant to be constructed, are normally on stand-by, but when the packaging plant is not operating the tunnel can continue to be fed with groups of modular supports using the empty sectors until the packaging plant resumes normal operation or until the buffer area is full.

Preferably the treatment apparatus also comprises a central microprocessor arranged to operationally correlate the devices in accordance with a time law predetermined on the basis of the products of the groups under treatment and to optimise the operation of that fraction of the rotary cylinder sectors which define the buffer zone.

The invention will be more apparent from the detailed description of a physical and/or chemical treatment apparatus for products together with a modular support for the products under treatment, given hereinafter by way of non-limiting example with reference to the accompanying drawing in which.

Figure 1:
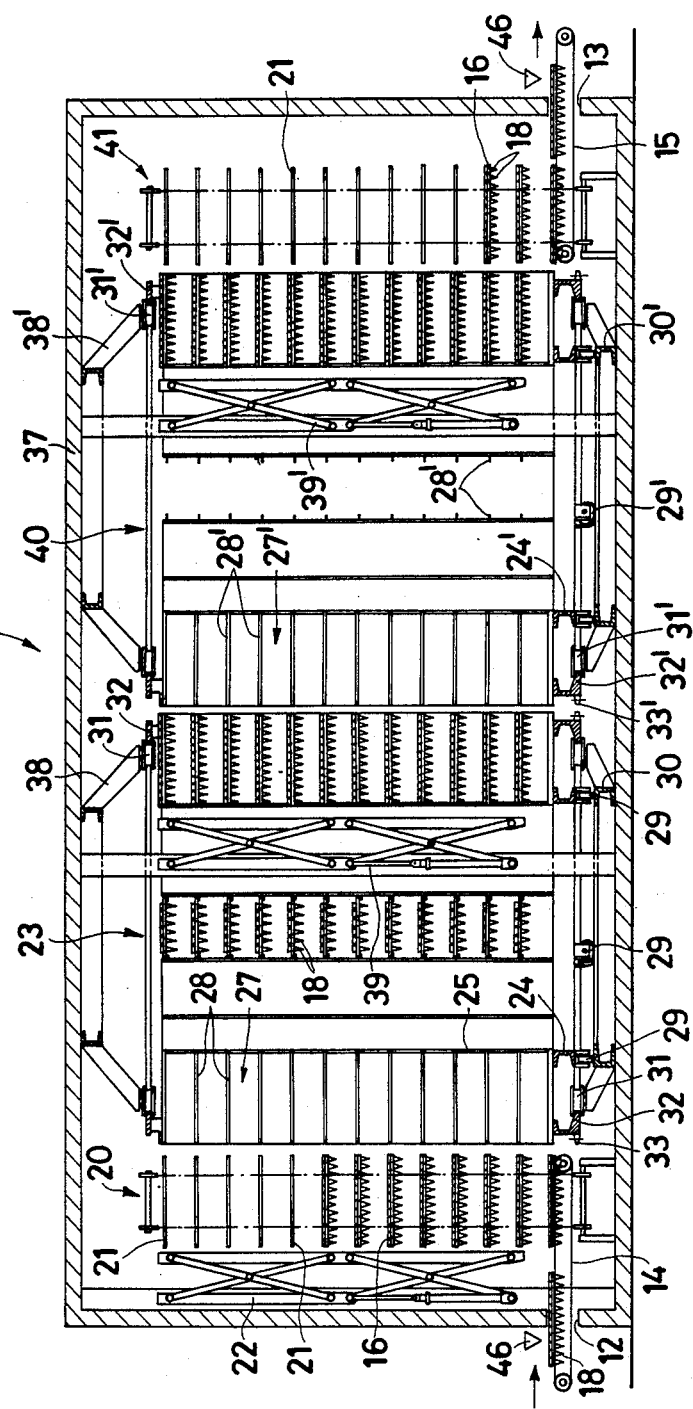
FIG. 1 is a diagrammatic side sectional view of the apparatus according to the invention.
Figure 2:
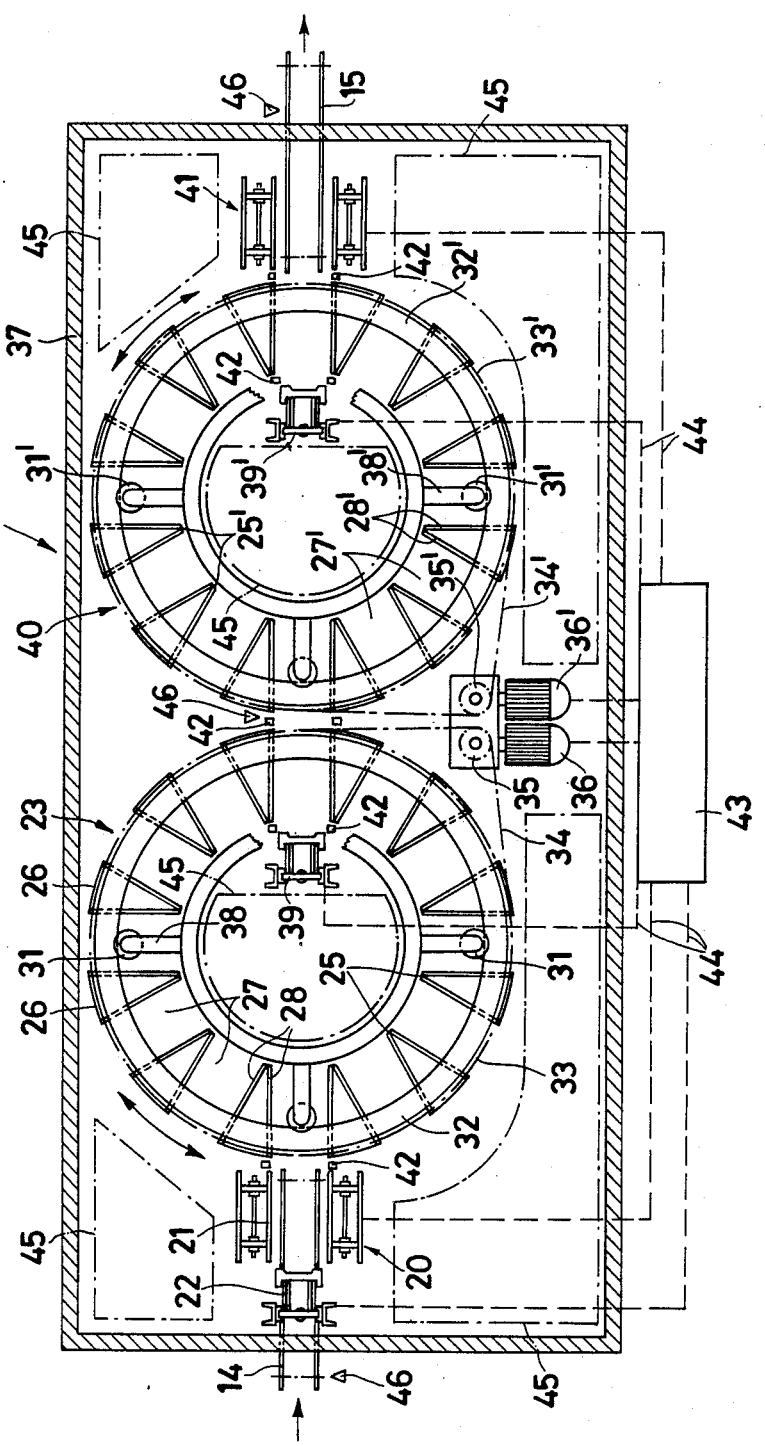
FIG. 2 is a plan view of the apparatus of FIG. 1.

With reference to FIGS. 1 and 2, a physical and/or chemical treatment apparatus according to the present invention, indicated overall by 11 and represented for example by a conditioning tunnel for food products, is included in an automatic plant (not shown) for the production of products.

Figure 3:
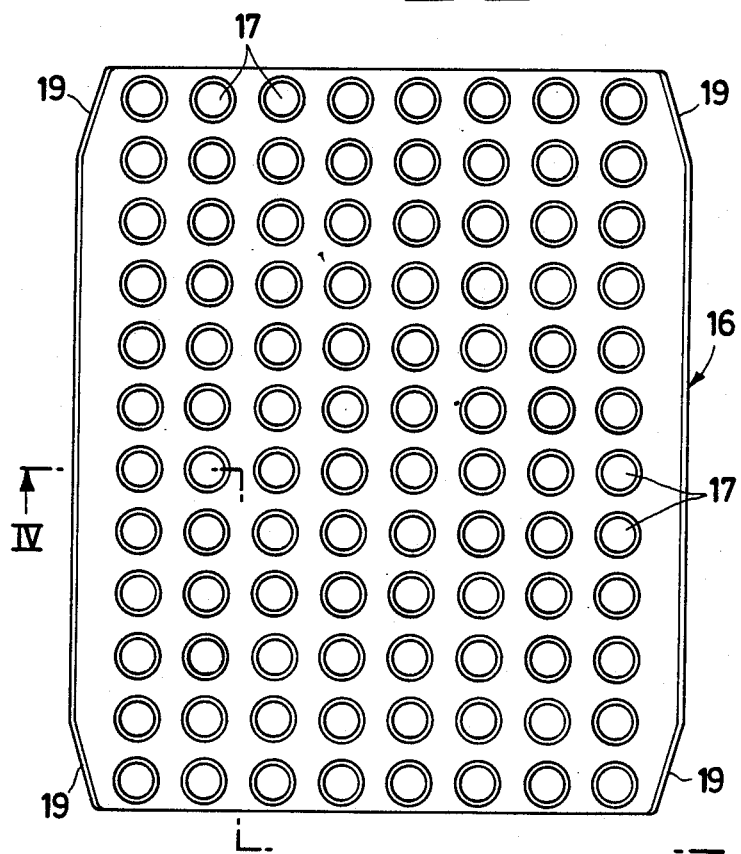
FIG. 3 is a top plan view of the modular support.
Figure 4:
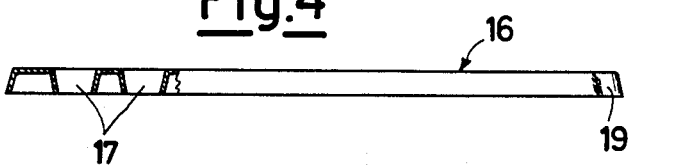
FIG. 4 is a section on the line IV—IV of the support of FIG. 3.

The tunnel 11 is provided with an inlet opening 12 and an outlet opening 13 through which a series of support modules 16 shown in FIGS. 3 and 4 are conveyed on respective conveying means 14 and 15.

Each modular support 16, in the form of a tray, is constructed for example of a plastics material such as polyethylene by moulding, and comprises a series of holes 17 or seats defined and distributed in accordance with a matrix arrangement to receive containers for single products indicated diagrammatically at 18 or supported products.

The holes 17, which in the example are shown circular, are used to house and to keep in ordered arrangement containers of the most varied type such as cones, cups etc., and can equally be of any shape. The modular support 16 can be constructed not only by moulding plastics material but by pressing metal, cardboard or any other material suitable for the physical and/or chemical treatment to which it is subjected. In addition the longer opposing sides of the modular support 16 are provided at their ends with tapered portions 19 or bevelled corners to facilitate their insertion into position.

Inside the tunnel 11 there is disposed in a position corresponding with the inlet opening 12 a vertical support arrangement device hereinafter referred to as stacking device 20 arranged to receive the modular supports 16 from the conveyor means 14 and to position them one above the other in respective support planes 21 defined by guides formed from section bars. This effects an initial storage and deposit and to form a group of vertically arranged modular supports. When the conveyor means 14 has loaded the required plurality or group of modular supports 16 onto the stacking device 20, a suitable vertically extending first pusher 22 associated frontwards with the stacking device 20 and for example having an articulated parallelogram structure loads the group of modular supports 16 onto a first cylindrical rotary storage container 23.

The cylindrical storage container 23 comprises an annular base 24 composed of section bars on which there are disposed vertical uprights 25 which together with lower and upper endpieces 26 of essentially triangular shape define and form radial loading sectors 27. Each sector 27 is provided with a plurality of suitable pairs of parallel guides 28 formed of L-shaped sections and rigid with the vertical uprights 25. They are disposed in pairs one above the other is superposed planes to define a position for the modular supports 16 pushed by the first pusher 22 from the stacking device 20 so as to form groups of modular supports. Providing a plurality of guides 28 disposed a vertical distance apart equal to the minimum height of a product 18 not only enables modular supports containing minimum-height products to be positioned in each of them but also makes it possible to receive modular supports containing higher products by selective insertion of the supports (such as one on every third guide, etc.). Rotating elements such as wheels 29 are rigid with the base 24 to enable the cylindrical container 23 to rotate on a floor 30. Horizontal rollers 31 fixed to the floor 30 act as guides for a circumferential shoe element 32 which is also horizontal and rigid with the base 24.

Sprocket toothing 33 extends radially on the outside of the base 24 and cooperates with a chain 34 driven by a sprocket 35 which is connected to a drive unit 36 in order to rotate the cylindrical container 23.

Rigid with the top of the inner structure 37 of the tunnel 11 there extends downwards an annular element 38 also carrying horizontal guide rollers 31 which cooperate with a further annular circumferential shoe element 32 to aid proper rotation of the cylindrical container 23.

Inside the first cylindrical container 23 in an empty portion there is positioned a second pusher 39 identical to the first pusher 22, which moves the group of modular supports 16 previously positioned in a sector 27 towards a second cylindrical container 40.

The second cylindrical container 40 is structured in a similar manner to the first cylindrical container 23 and equivalent components are indicated by the same reference numerals followed by a prime (24', 25' etc.).

A third pusher 39' is also positioned within the second cylindrical container 40 and acts on the group of modular product supports 16 contained in a sector 27' to push them towards a vertically rearranging device 41 acting as a stack dismantling and evacuation means able to receive one of the group of modular supports at a time and to vertically rearrange the group to feed each modular support of the group in succession onto the conveyor means 15 aligned with the outlet opening 13 of the conditioning tunnel 11. During the entire loading and unloading of the group of modular supports 16 disposed in the individual sectors 27 of the cylindrical containers 23 and 40, centering elements indicated schematically by 42 are used to correctly align the pushers 22, 39 and 39' with the individual sectors 27, 27' concerned and with the stacking devices 20 and 41.

The rotation of the two cylindrical containers 23 and 40, which can be continuous or follow a predetermined law, and is mutually independent, is maintained until either a new group of modular supports 16 is ready on the stacking device 20 or one of the group of modular supports disposed in a sector 27, 27' has to be moved to another cylindrical container or discharged onto the evacuation device 41. Thus the stacking device 20 is used to form groups of modular supports 16 to be loaded, while the evacuation device 41 disposed at the outlet end of the apparatus receives one at a time each group of modular supports loaded into a sector of one of the cylindrical container and dismantles each group to feed the modular supports in succession onto a conveyor means.

The operational correlation between these movements and the various drive means (some of which are not shown) is done by a microprocessor 43.

In this respect, a series of connecting lines 44 connects to the microprocessor 43 the various drive means for the conveyors, pushers, stacking device and cylindrical containers. All of the devices are correctly mutually positioned by the centering elements 42, and the inlet and outlet sensors 46.

As can be seen from FIG. 2, free surfaces indicated by dashed and dotted lines 45 located around the cylindrical containers 23, 40, which must be at least one in number, but can be of any number within the treatment apparatus, form positioning zones for auxiliary treatment devices such as evaporators, fans etc.

In a general conditioning plant provided with an apparatus according to the invention the operating cycle commences when the modular supports 16 or trays arriving from the filling line (not shown) are fed by the conveyor means 14 to the stacking device 20. Here the modular supports are vertically arranged in group of a required number on the supports 21. When the required number of the group has been formed, the first pusher 22 can be used to position the group within an empty sector 27 of the first cylindrical container 23, which has been halted in the correct position because of the presence of the centering elements 42. When the plurality or group of modular supports 16 has been positioned within the sector 27 of the first cylindrical container 23, this container begins to rotate about its axis to allow good ventilation of the product to be conditioned. The rotation, determined by the drive unit 36, continues for example until the next group of modular supports 16 has been completed on the stacking device 20. The microprocessor 43, which controls all the functions of the entire plant and thus also the treatment apparatus 11 according to the invnetion, determines the correct stoppage of an empty sector 27 of the cylindrical container 23 at the loading zone for receiving the group of the modular supports 16 of the stacking device 20.

Rotation continues until a group of modular supports 16, correctly positioned within a sector 27 of the first cylindrical container 23, has remained for the predetermined retention time, at which the microprocessor 43 causes the container 23 to halt in correspondence with the second pusher 39. The second pusher 39, also controlled by the microprocessor 43, discharges the group of trays onto the second cylindrical container 40. This is possible because in the meantime the second cylindrical container 40 has been halted in the correct position by the action of the centering elements 42 disposed between the two containers 23 and 40. The position assumed by the second container 40 on halting is such that it presents an empty sector 27' to the group of modular supports 16 present in the sector 27 of the first cylindrical container 23 and which are to be transferred.

When the predetermined retention time in the second cylindrical container 40 has also passed, this container is halted by the microprocessor 43 so that by means of further centering elements 42 the sector 27' lies opposite the evacuation device 41 so that a further third pusher 39', also disposed within the second cylindrical container 40, discharges the group of modular supports 16 ready for packaging.

Conveying to the packaging line is provided by the conveyor means 15 which receives the individual modular supports 16 from the evacuation device 41 and feeds them in succession one after another towards the exit opening 13 of the conditioning tunnel 11. The first cylindrical container 23, the second cylindrical container 40 and any other cylindrical container, if present, operate in accordance with a time relationship determined by the logic of the microprocessor 43 which automatically starts the rotation, and controls the positioning, the transfer, the loading and unloading in the correct empty or full sectors. This takes place for example in accordance with the particular requirements of the product or products to be treated. It is also true that because of the use of a microprocessor for controlling the tunnel functions, it is possible to continuously vary the times for which the products remain within the tunnel and the method of loading, and again it is possible to continue to discharge the product contained in the tunnel while loading a completely different product with different timing requirements for conditioning. As stated, the apparatus according to the invention attains the object of making the feed independent of the discharge and of creating a storage or buffer zone which provides continuity of production and operation as the more common hold-ups can be absorbed by it. Moreover, each cylindrical container receives and transfers groups of trays not mechanically and repetitively but dynamically by using the most convenient empty sector and discharging those groups which have undergone treatment onto the evacuation device. These operations take place in accordance with a time relationship controlled by the microprocessor, which causes a group of trays to be discharged only after the time required for conditioning an individual group of trays has expired.

Consequently, individual sectors of the cylindrical containers can be loaded with groups of modular supports where each group carries different products with different conditioning times. This is because the individual sectors are independent of any one predetermined time relationship and instead depend on the conditioning time required for the products contained in their individual group. In this respect, once it has received a group of modular supports, each cylindrical container can rotate continuously for an indeterminate time and thus undergo a fraction of a revolution or one or more revolutions, until either a new group is presented to the feed end or a group which undergone its conditioning process is ready for evacuation. Such rotation also facilitates optimum homogeneous physical and/or chemical treatment.

Another advantage implied by such an apparatus is that the loading and unloading frequencies of the conditioning tunnel are not strictly related; i.e. it will be possible to produce at a speed higher than the packaging speed almost reaching the saturation of the tunnel.

This will enable to stop the filling or production line in order to equip it with a configuration suitable for another product to be processed. Meanwhile the product inside the tunnel will continue to be moved to the packaging zone. In this way it is not necessary to completely stop the apparatus if the product to be processed has to be change of consequently obtaining a considerable decrease in the production cost.

I claim:

1. A high-capacity product treatment apparatus for use in an automatic product production plant; said apparatus comprising a first horizontal feed conveyor, a tunnel and a second horizontal discharge conveyor; said first horizontal feed conveyor feeds into said tunnel a plurality of modular supports; said second horizontal discharge conveyor carries from said tunnel the modular supports; said modular supports carry the products; a vertical support arrangement device being positioned within said tunnel adjacent said first horizontal feed conveyor for intercepting a number of modular supports and arranging each of the modular supports into spaced vertical alignment with another of the modular supports to form a group of modular supports; at least one cylindrical rotary storage container being positioned adjacent said vertical support arrangement device and said second horizontal discharge conveyor; said at least one cylindrical rotary storage container being divided into radial sectors; each radial sector having a plurality of parallel guides positioned in a superposed plane with the group of modular supports carried by said vertical support arrangement device; a first pusher device being positioned adjacent said vertical support arrangement device, said first pusher device causing movement of the group of modular supports from said vertical support arrangement device onto said at least one cylindrical rotary storage device; a vertical support rearranging device being positioned adjacent said at least one cylindrical rotary device and said second horizontal discharge conveyor; said at least one cylindrical rotary storage device being rotatable to bring one of the groups of modular supports into superposed position with said vertical support rearranging device; a second pusher device positioned adjacent said at least one cylindrical rotary storage device; said second pusher device moving a group of modular supports from said at least one cylindrical storage device onto said vertical support rearranging device; said vertical support rearranging device moving the group of modular support into contact with said second horizontal discharge conveyor whereby individual modular supports of the group are discharged in succession onto said second horizontal discharge conveyor and exited from said tunnel.

2. An apparatus as claimed in claim 1, wherein said at least one cylindrical container storage device is also provided with rotary elements which cooperate with shoe elements for determining its correct rotation, and there is also provided on the exterior of the base of said at least one container storage device a sprocket-toothed ring which cooperates with a chain driven by a sprocket wheel of a drive unit to rotate said at least one container storage device.

3. An apparatus as claimed in claim 1, wherein said second pusher device associated with said at least one cylindrical container storage device is positioned in an inner hollow portion of said at least one cylindrical container storage device.

4. An apparatus as claimed in claim 1, wherein said first and second pusher devices have an articulated parallelogram structure.

5. An apparatus as claimed in claim 1, wherein said modular supports are of tray and each comprise a series of holes or seats positioned in a matrix arrangement to receive the products.

6. An apparatus as claimed in claim 5, wherein said modular support is constructed of a material suitable for said physical and/or chemical treatment by moulding.

7. The apparatus as claimed in claim 1, wherein said apparatus includes a microprocessor for controlling and indexing operational relationship of said first and second horizontal conveyors, said vertical support arranging and rearranging devices, said at least one cylindrical rotary storage device and said first and second pusher devices; and a series of sensor elements positioned at inlet and outlet openings of said tunnel and at said individual radial sectors whereby the groups of modular supports are loaded upon and unloaded from said radial sectors in accordance with a predetermined time relationship dictated by said microprocessor based upon a predetermined number of modular supports making up the group which are fed said series of sensors positioned at said inlet of said tunnel whereby idle time is minimized.

8. The apparatus as claimed in claim 1, wherein said apparatus includes centering elements disposed between said vertical support arranging device said at least one cylindrical rotary storage device, and between said vertical support rearranging device cylindrical rotary storage device whereby proper alignment of said vertical support arrangement and rearrangement devices and the radial sectors of said at least one cylindrical rotary container storage device is assured.

9. The apparatus as claimed in claim 1, wherein said apparatus includes a second cylindrical rotary container storage device positioned between said first cylindrical rotary container storage device and said vertical support rearranging device, and a third pusher device associated with said second cylindrical rotary container storage device for moving groups of modular supports which have been received from said first cylindrical container storage device to said vertical support rearranging device.

10. The apparatus as claimed in claim 1, wherein said vertical support arranging and rearranging devices are each vertical conveyors.

* * * * *